July 4, 1939.                L. H. OTTOFY                2,164,663
                          PHONOGRAPHIC DEVICE
                          Filed Oct. 25, 1937
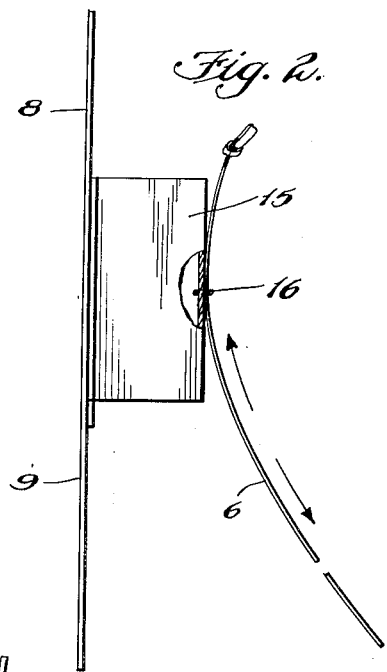
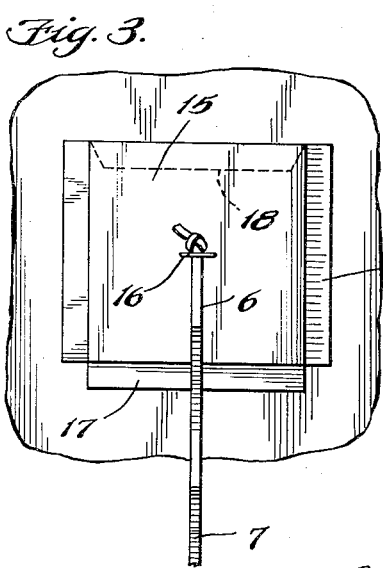
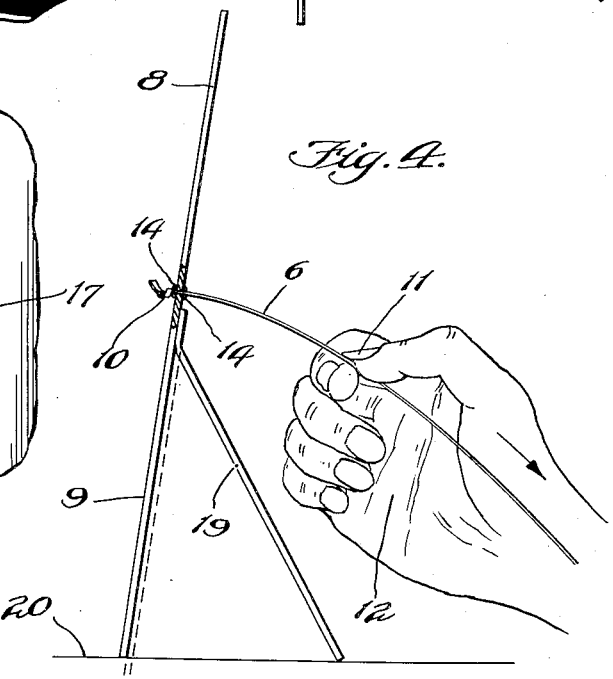
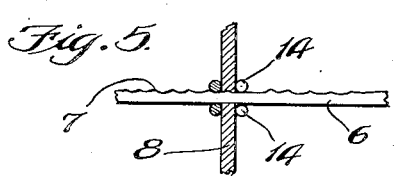
Inventor
Ladis H. Ottofy.
By Kent W. Worrell
                Atty.

Patented July 4, 1939

2,164,663

UNITED STATES PATENT OFFICE 2,164,663

PHONOGRAPH DEVICE

Ladis H. Ottofy, Chicago, Ill.

Application October 25, 1937, Serial No. 170,829

6 Claims. (Cl. 46—189)

This invention relates in general to a manually operated device for repeating words, phrases, slogans, and the like, and has more particular reference to an advertising, novelty or toy device of the kind for various purposes.

An important object of the invention is in the provision of an inexpensive toy or novelty phonograph which is easily operated by hand for producing a recorded sound.

A further object of the invention is in the provision of a cardboard or other sheet sounding board with an amplifying box for the sound produced.

A still further object of the invention is in the provision of an advertising or other novelty display device having a sound record strip attached thereto for manually producing a recorded sound by movement of the strip with respect to the display or by moving a thumbnail of an operator over the sound strip attached to the display device.

Other objects of the invention will appear hereinafter, the preferred construction and arrangement being illustrated in the accompanying drawing, in which:

Fig. 1 is a face view, and

Fig. 2 is a side elevation of a display or advertising device embodying this invention;

Fig. 3 is a fragmentary rear view;

Fig. 4 is a modification illustrating the device in the form of an easel; and

Fig. 5 is an enlarged view of the attachment of the sound strip through the easel.

This talking device comprises a flexible sound strip 6 of Celluloid and the like and of suitable length to receive the recording of a short message, slogan or saying, by suitably engraving or otherwise forming transverse ribs or depressions 7 in one surface of the strip such that when the strip is suitably engaged it will produce vibrations which if properly amplified may be readily heard.

A suitable sounding board, diaphragm, or amplifying device may consist of a plain sheet of stiff cardboard 8 or other suitable sheet material which may be outlined and colored to form a Santa Claus 9 as shown in Fig. 1, or any other suitable figure. The sound strip may be applied directly to this board by inserting it therethrough adjacent the center as shown in Fig. 4, with a knot or curl 10 at or near each end of the strip to prevent it from becoming disengaged from the board and allowing the strip either to be pulled manually in both directions through the board or to hold the strip by one end in contact with the board so that the thumbnail 11 of an operator's hand 12 may be pressed against the sound record on the strip as the hand is moved along the strip, causing corresponding vibrations to be imparted to the sounding board 8 by such movement.

If the sound record strip is intended to be moved through the board to produce the sound, it is preferable to insert it through an opening 13 between staples 14 placed close together at opposite sides of the hole so that the ribs or undulations of the strip will engage one of the staples as the strip is pulled through the board, thus producing the sound waves which are amplified by the board. These staples prevent wearing of the board by the movement of the sound strip, and they insure a tight contact of the strip for transmitting the vibrations to the board.

In order to further amplify the sound produced, the sound record strip may be attached to a sound box 15 formed of stiff paper, cardboard, or other suitable material, and attached to the back of a display sheet composed of the same or similar material, the strip being attached to the box by means of a staple 16 under which it extends, and the box being attached to the back of the display by bent edge tabs 17 of which the top 18 or one of the tabs may be turned inwardly to form a box or receptacle for containing candies or other goods.

If this sounding box is applied to a display figure such as a Santa Claus as shown in Fig. 1, it may be shown with a megaphone 21, either cut out or as a part of the illustration, indicating the source of the sound and adding novelty to the display.

If desired a display as shown in Fig. 4 may be provided with an easel 19 by means of which it may be set up upon any suitable support or plain surface 20 either in the form of a single sheet or with a sound box as shown in Fig. 2.

In operation the sounding board 8 is grasped in one hand and the sound record strip is either pulled through against a staple or it is pinched between the thumb and forefinger of the operator's hand so that the thumbnail is moved uniformly over the strip, producing the sound vibrations which are amplified by the board to reproduce the sounds recorded on the strip. The reverse movement of the strip with respect to the sounding board is not intended to produce any definite words but sometimes adds interest to the device depending upon the intended recording and the proper direction of movement. Various tones and modulations are produced by varying the speed and uniformity with which the sound vibrations are made.

I claim:

1. In a phonographic device, the combination with a display sheet forming a sounding diaphragm, of a sound record strip having a recorded sound track at one side thereof, and a staple secured to the diaphragm under which the sound strip is tightly but slidably inserted and against which it is moved for transmitting the vibrations produced by the relative movement of the staple and the sound strip to the diaphragm.

2. A phonographic device comprising a sheet sounding board, a sound record strip inserted through the central part of the board, a pair of staples placed close together to closely but slidably engage opposite sides of the strip for transmitting vibrations produced by engagement with the sound record strip upon relative movement of the strip and staples.

3. In a phonographic device, a display sheet, a sound box attached to one face thereof, a sound record strip having sound record projections at one side thereof, and a staple secured to the sound box under which the strip extends tightly but slidably for transmitting vibrations therefrom to the sound box and said display sheet upon relative movement of the strip and staple.

4. In a phonographic device, a display diaphragm having a sounding box attached to one face thereof, the box being open at one end for the insertion of commodities, the bottom of the box having a staple extending therethrough, a sound record strip extending tightly but slidably under the staple and against the box for communicating vibrations thereto when the strip is engaged and when it is moved relatively to the staple, the vibrations being transmitted by the box and the display diaphragm.

5. In a phonographic device, a display figure composed of sheet material having a sound opening therein, a sounding box attached at the back of the figure and enclosing the opening, a sound record strip and staple means for slidably attaching the strip to the bottom of the box for engaging the strip as it is moved relative to the staple and for transmitting the vibrations imparted by the strip to magnify the sound transmitted through the opening.

6. In a phonographic device, a display in the form of a figure formed of sheet material, sound producing means attached centrally of the display, said means comprising a sound record strip and a staple under which the strip passes tightly but slidably for communicating vibrations imparted by contact with the strip to the display sheet as they are relatively moved, and a folding easel attached to the back of the display by means of which it may be supported in an upright position independent of the record strip.

LADIS H. OTTOFY.